United States Patent [19]

Rains

[11] 4,298,627

[45] Nov. 3, 1981

[54] POTATO TREATS

[76] Inventor: Hettie L. Rains, Rte. 2, Box 1022, Williamsburg, Ky. 40769

[21] Appl. No.: 758,500

[22] Filed: Jan. 11, 1977

Related U.S. Application Data

[63] Continuation-in-part of Ser. No. 548,894, Feb. 11, 1975, abandoned.

[51] Int. Cl.$^3$ .............................................. A23L 1/216
[52] U.S. Cl. .................................... 426/637; 426/262; 426/438
[58] Field of Search ........................ 426/637, 438, 482

[56] References Cited

U.S. PATENT DOCUMENTS 2,056,884  10/1936  Brunsletter .......................... 426/438

FOREIGN PATENT DOCUMENTS 408368  4/1934  United Kingdom ................ 426/438

OTHER PUBLICATIONS

Woman's Day Encyclopedia of Cookery, vol. 9, p. 1458 Eileen Tighe (ed) N.Y. 1966.
*Woman's Day Encyclopedia of Cookery* vol. 1 p. 38 Eileen Tighe (ed), Fawcett Publication, Inc. N.Y. 1966.
*The Forget-About Meat Cookbook* Karen Brooks Rodale Press, Inc. Emmaus, Pa. 1974.
*Country Commune Cooking* Lucy Horton Coward, McCann & Geoghegan, Inc. N.Y. 1972.

*Primary Examiner*—David M. Naff
*Assistant Examiner*—Elizabeth A. Hatcher
*Attorney, Agent, or Firm*—Martin J. Skinner

[57] ABSTRACT

A natural food product, in the form of potato snacks or treats, is disclosed. This product is the result of deep frying thin peelings of white potatoes. Presoaking of the peelings provides improved color and crispness. The product is a snack food highly concentrated in minerals without the attendant quantity of carbohydrates that exist in other potato snack foods.

3 Claims, No Drawings

POTATO TREATS

BACKGROUND OF THE INVENTION

This application is a continuation-in-part of my co-pending application Ser. No. 548,894, filed Feb. 11, 1975 and now abandoned.

My invention relates generally to snack foods and more particularly to a natural potato snack food having a high proportion of minerals as compared to the quantity of carbohydrates.

It is well recognized that the eating habits of humans have changed during the last generation or two. This is especially true in the United States where food is prepared using more highly refined products. Furthermore, there is a high consumption of snack-type foods: products derived from potatoes, corn and other vegetables. The refining processes remove considerable of the natural vitamins and minerals of the starting material, thus requiring the "fortification" of the product with added quantities of these essential food nutrients.

The need for a balance of minerals in order to fully utilize the uptake of vitamins is also recognized. Persons whose intake of snack foods is high are often found to be lacking in the use of vitamins by the body; they also have a high intake of carbohydrates giving rise to weight problems for some. Thus, there appears to be a need for a snack food which provides a concentrated source of minerals, without large quantities of carbohydrates, so that the body may better use the intake of the vitamins.

Only a portion of this goal is met by the improved snack foods of recent years. Corn and potato chips now contain added quantities of minerals to make up for those lost in the processing. For example, potato chips are generally prepared from potatoes with the skins removed. The skins are removed by paring or abrasion, with the waste often being discarded. In some instances, the skin is powdered so as to be used as an ingredient in other foods. However, the skin is the primary source of minerals within a whole potato. Thus, the resultant potato chips are high in carbohydrates and low in minerals, unless "reconstituted" as in Proctor and Gamble "Pringle's" or Standard Brands, Inc. "Planter's Potato Chips". Typical patents for these products are U.S. Pat. Nos. 3,498,798 and 3,576,647.

In some instances, the skin is retained on the potato chip. Such products are described in U.S. Pat. No. 2,056,881 to B. Brunstetter and British Pat. No. 408,368 to H. R. Spencer. While the product of the processes described in these patents retain a high degree of the minerals, due to the retention of the skin, the quantity in any eating portion is only in the same proportion as the starting potato. As above, the product is high in carbohydrates.

SUMMARY OF THE INVENTION

My invention is a natural food product useful for snacking purposes which is a concentrated source of minerals present in white potatoes, without the normal proportion of carbohydrates, which comprises peelings of white potatoes which have been subjected to deep-fat frying techniques, with the product dried, seasoned for pleasant taste and packaged for distribution as potato treats.

DETAILS OF THE INVENTION

According to my invention, fresh quality white potato skins, as peelings, are treated (optionally) in a dilute vinegar solution, dilute salt water and/or with salt, and subsequently fried in an edible oil, such as a vegetable oil, until golden brown. By "fresh quality" I mean freshly peeled potatoes or defrosted skins that were initially frozen immediately after their removal from the potato. It should be understood that the skin must be free of dirt and/or any damaged areas.

By the term "peel" or "peeling" I mean a strip of potato skin generally $\frac{3}{8}$ to $\frac{1}{2}$ in. ($\sim$ 1–1.25 cm) wide, 1/32 to 1/16 in. (0.8–1.6 mm) thick and 1 to 3 in. (2.5–7.5 cm) long. The dimensions may vary from these values; however, the thickness is not intended to exceed about $\frac{1}{8}$ in. (3.2 mm) to minimize the amount of potato body. Since the bulk of the minerals, vitamins and fiber content of white potatoes are in the skin, I achieve the concentration of these ingredients (e.g., units of minerals/unit weight) significantly. It may be shown, for example, that the volume of a 1/16 in. layer of a 2 in. (5 cm) diameter potato is only about 0.12 the volume of the whole potato; yet this volume contains almost all of the minerals of the potato. For larger potatoes, this ratio of skin volume to total volume is even smaller. Similarly, since the body of the potato is primarily carbohydrate-containing, I substantially eliminate this in the use of only the peels.

Although the variety of white potato is not critical to my invention, certain varieties are known to have thicker skins and generally are preferred. Since the skin is thicker, less potato body is included with the peels. One such variety is the Idaho potato; another is the Cobbler potato. White potatoes such as these contain an average of 11 mg calcium, 56 mg phosphorous, and 1 mg iron per 100 g of potato. Substantially all of these minerals are in the skins.

The vinegar presoaking solution I use is prepared by adding the equivalent of $\frac{1}{2}$ cup commercial apple cider vinegar (4–6% acidity) to water making a total of one gallon of solution. The presoaking of peelings in such a solution results in a reddish-tan color of the fried product which is more attractive than without such a presoak. This soaking, as well as soaking in a dilute saltwater solution (two tablespoons table salt/gal. water), also increases the puffiness of the product of frying thereby adding to the attractiveness thereof. Furthermore, treatment with these solutions or with dry salt prevents any discoloration of the peelings prior to frying and thereby enhances the color of the product.

I use a vegetable oil, typically "Crisco", for the frying of the potato peels although any of the common edible oils may be used. It has been found that a temperature range of about 325° to 350° F. is optimum for the frying using this oil. At a lower temperature the frying proceeds too slowly and the peels absorb excessive oil. At temperatures much higher than this range, smaller pieces become over cooked too quickly and are much darker than the rest. Some may actually burn in a relatively short time. Also, higher temperatures are generally more dangerous.

The time required for frying will depend upon several factors: size of individual peelings; size of the peeling batch; and the temperature. The time is shorter for small pieces, small batches and higher temperatures. The converse is true for bigger pieces, larger batches and lower temperatures.

The following examples describe typical preparation of my potato treats.

EXAMPLE I

Two pounds of fresh white potato peelings were soaked in a gallon of water to which had been added ½ cup commercial apple cider vinegar (4-6% acidity). The peelings were removed after 10 minutes, drained and the excess water removed. The peelings were then immersed in a vegetable oil heated at 325°-350° F. (163°-177° C.) and fried for 30-40 minutes resulting in a crisp golden tan product. Excess oil was removed using, for example, an absorbent paper towel. The product weighing about one pound, was salted to taste.

EXAMPLE II

The conditions used in Example I were utilized with the exception that the presoaking solution was a gallon of water to which two tablespoons of table salt had been added. The product, after frying, was crisp but lighter in color.

EXAMPLE III

Two pounds of white potato peels were treated with two tablespoons of table salt. After standing for about five minutes, they were deep-fat fried at 325° to 350° F. for 30 to 40 minutes. The product was much like that in Example II; however, their crisp texture was retained for a longer time and the flavor was excellent.

EXAMPLE IV

White potato peelings were immediately frozen after removal from the bulk of the potato. Two pounds of these peelings were then placed in the vinegar solution used in Example I. After the peelings were thawed, they were drained, dried and fried at 325°-350° F. for 30-40 minutes resulting in a dark tan product with a real potato taste.

EXAMPLE V

Two pounds of fresh white potato peelings were shredded into pieces approximating the size of peanuts and treated with one tablespoon of table salt for 3 minutes. These pieces were deep-fat fried at 325° to 350° F. for about 20 to 30 minutes and resulted in crisp, well tanned nuggets that retained their texture very well.

From the foregoing, it may be seen that I have developed a unique potato product made from material that is normaly discarded. This product preserves the nutritious values of white potatoes making the minerals available to the user as a snack to supplement the diet. The potato snack food, or as I call them "potato treats", may be served immediately after frying or, after additional dehydration, may be packaged and dispensed in the same manner as potato or corn chips and the like. They may also be vacuum packed for later consumption. Being highly concentrated in minerals, with a low carbohydrate content, my potato treats will be acceptable to persons who have weight problems or to children who are prone to "snacking". In addition to containing the bulk of the nutrients of the potato, my potato treats have a conventional potato flavor as contrasted to fried potato chips.

I claim:

1. A potato-based snack food having a crisp texture, tan color, natural potato taste, containing substantially all of the natural minerals and essentially devoid of the natural carbohydrates of potatoes, which consists essentially of fresh white potato peelings removed from potatoes, deep-fat fried in an edible oil at a temperature of about 325°-350° F. for a time sufficient to produce said crisp texture and tan color to said snack food.

2. The snack food of claim 1 wherein said fresh white potato peelings are shredded prior to cooking in said oil.

3. The snack food of claim 1 wherein said fresh white potato peelings are soaked in a cider vinegar solution, prepared by diluting 4-6% acidity vinegar with 32 parts water, and then drained of excess moisture prior to the deep-fat cooking whereby the tan color of the product is enhanced upon cooking.

* * * * *